United States Patent
Zheng et al.

(10) Patent No.: US 11,372,125 B2
(45) Date of Patent: Jun. 28, 2022

(54) AMPHIBIOUS PORTABLE MAGNETISM DETECTOR

(71) Applicants: TSINGHUA UNIVERSITY, Beijing (CN); BEIJING INSTITUTE OF SATELLITE ENVIRONMENTAL ENGINEERING, Beijing (CN)

(72) Inventors: Xiao-Ping Zheng, Beijing (CN); Zhen-Yuan Sun, Beijing (CN); Bin Wang, Beijing (CN); Hua Geng, Beijing (CN); Xiao-Jiao Deng, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 176 days.

(21) Appl. No.: 16/847,659

(22) Filed: Apr. 14, 2020

(65) Prior Publication Data
US 2020/0333496 A1 Oct. 22, 2020

(30) Foreign Application Priority Data
Apr. 19, 2019 (CN) .......................... 201910317644.6

(51) Int. Cl.
*G01V 3/08* (2006.01)
*G01V 3/165* (2006.01)
*G01V 3/17* (2006.01)

(52) U.S. Cl.
CPC .............. *G01V 3/081* (2013.01); *G01V 3/165* (2013.01); *G01V 3/17* (2013.01)

(58) Field of Classification Search
CPC ........... G01V 3/081; G01V 3/165; G01V 3/17
USPC ......................................................... 324/345
See application file for complete search history.

(56) References Cited

U.S. PATENT DOCUMENTS

| 3,549,982 A | 12/1970 | Jules |
| 3,753,185 A | 8/1973 | Mahan |
| 6,586,937 B2* | 7/2003 | Goodman ................ G01V 3/15 324/345 |
| 7,420,364 B2* | 9/2008 | Honkura .................. G01C 9/06 73/514.31 |
| 7,443,154 B1* | 10/2008 | Merewether ........... G01V 3/081 324/67 |

(Continued)

FOREIGN PATENT DOCUMENTS

| CN | H11190720 | 7/1999 |
| CN | 206223649 | 6/2017 |

(Continued)

*Primary Examiner* — Jermele M Hollington
*Assistant Examiner* — Sean Curtis

(57) ABSTRACT

An amphibious portable magnetism detector includes a first housing, a first wiring tube, a first magnetic field sensor, and a central control device. The first housing defines a first inner space and a first through hole in communication with the first inner space. The first wiring tube is connected to the first housing with a first leak-tight seal formed between them, and in communication with the first inner space via the first through hole. The first magnetic field sensor is disposed in the first inner space and configured to detect a magnetic field at a target area and generate a first detection signal. The central control device is electrically connected to the first magnetic field sensor and configured to receive the first detection signal and output a first magnetic field value according to the first detection signal.

19 Claims, 6 Drawing Sheets

(56) References Cited

U.S. PATENT DOCUMENTS

| | | | | |
|---|---|---|---|---|
| 7,518,374 | B1 * | 4/2009 | Olsson | G01V 3/165 |
| | | | | 324/67 |
| 7,733,077 | B1 * | 6/2010 | Merewether | G01V 3/104 |
| | | | | 324/67 |
| 10,082,599 | B1 * | 9/2018 | Olsson | G01V 3/12 |
| 10,761,239 | B1 * | 9/2020 | Olsson | G01V 11/00 |
| 11,187,761 | B1 * | 11/2021 | Olsson | G01R 33/0206 |
| 11,187,822 | B2 * | 11/2021 | Olsson | H01Q 1/04 |
| 2006/0178849 | A1 * | 8/2006 | Maier | G01V 3/12 |
| | | | | 702/66 |
| 2006/0181280 | A1 * | 8/2006 | Mulcahey | G01V 3/165 |
| | | | | 324/326 |
| 2007/0069721 | A1 * | 3/2007 | Honkura | G01C 9/06 |
| | | | | 324/247 |
| 2011/0109437 | A1 * | 5/2011 | Olsson | G01S 19/14 |
| | | | | 340/8.1 |
| 2014/0167766 | A1 * | 6/2014 | Olsson | H01Q 7/06 |
| | | | | 324/329 |
| 2017/0299756 | A1 | 10/2017 | Weaver et al. | |
| 2020/0333496 | A1 * | 10/2020 | Zheng | G01V 3/15 |

FOREIGN PATENT DOCUMENTS

| | | | | |
|---|---|---|---|---|
| CN | 207475736 | | 6/2018 | |
| CN | 208476870 | | 2/2019 | |
| EP | 0216070 | | 4/1987 | |
| EP | 1628114 A1 * | | 2/2006 | G01C 17/30 |
| EP | 1628114 B1 * | | 4/2008 | G01C 17/30 |
| EP | 2895890 B1 * | | 3/2020 | G01V 3/083 |
| WO | WO-2006088742 A2 * | | 8/2006 | G01V 15/00 |
| WO | WO-2014043580 A2 * | | 3/2014 | G01V 3/083 |
| WO | WO-2017019096 A1 * | | 2/2017 | E21B 47/0905 |
| WO | WO-2020004161 A1 * | | 1/2020 | G01D 5/142 |

\* cited by examiner

AMPHIBIOUS PORTABLE MAGNETISM DETECTOR

CROSS-REFERENCE TO RELATED APPLICATIONS

This application claims all benefits accruing under 35 U.S.C. § 119 from China Patent Application No. 201910317644.6 filed on Apr. 19, 2019 in the National Intellectual Property Administration of China, the contents of which are incorporated by reference herein.

FIELD

The present disclosure relates to the field of magnetic field detection technology, and particularly to an amphibious portable magnetism detector.

BACKGROUND

A magnetic object can create a magnetic field in the surrounding space. Detecting the magnetic field distribution in the space and reversely deducing a structure and a location of a magnetic object is a commonly used technique to detect the magnetic object. Compared with directly detecting the exact strength value of the magnetic field, detecting a magnetic field gradient (i.e., a variation of the magnetic field in the space) is more sensitive, accurate, and resistant to interference, and has been widely used in the exploration of a magnetic target, the investigation of an internal structure of an object, and the non-destructive testing of metal defects.

However, conventional portable magnetism detectors are generally used on land.

SUMMARY

The present disclosure provides an amphibious portable magnetism detector.

The amphibious portable magnetism detector includes a first housing, a first wiring tube, a first magnetic field sensor, and a central control device. The first housing defines a first inner space and a first through hole in communication with the first inner space. A first leak-tight seal is formed between the first wiring tube and the first housing to keep the first housing leak-tight. The first wiring tube is disposed outside the first housing, connected to the first housing, and in communication with the first inner space via the first through hole. The first magnetic field sensor is disposed in the first inner space and configured to detect a magnetic field at a target area and generate a first detection signal. The central control device is electrically connected to the first magnetic field sensor and configured to receive the first detection signal and output a first magnetic field value according to the first detection signal.

In the present disclosure, the first housing can be leak-tight to prevent water from entering into the first inner space, thereby effectively avoiding the damage of the first magnetic field sensor caused by water and ensuring the normal operation of the first magnetic field sensor. The magnetism detector can be applied not only on dry land, but also on wetland or water area.

BRIEF DESCRIPTION OF THE DRAWINGS

Implementations are described by way of example only with reference to the attached figures.

DETAILED DESCRIPTION

Figure 1:
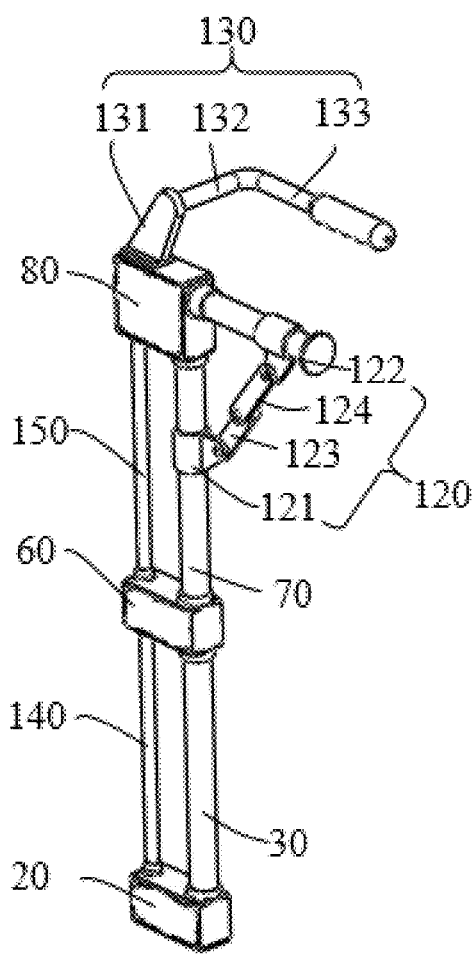
FIG. 1 is a schematic perspective view of an amphibious portable magnetism detector according to an embodiment of the present disclosure.
Figure 2:
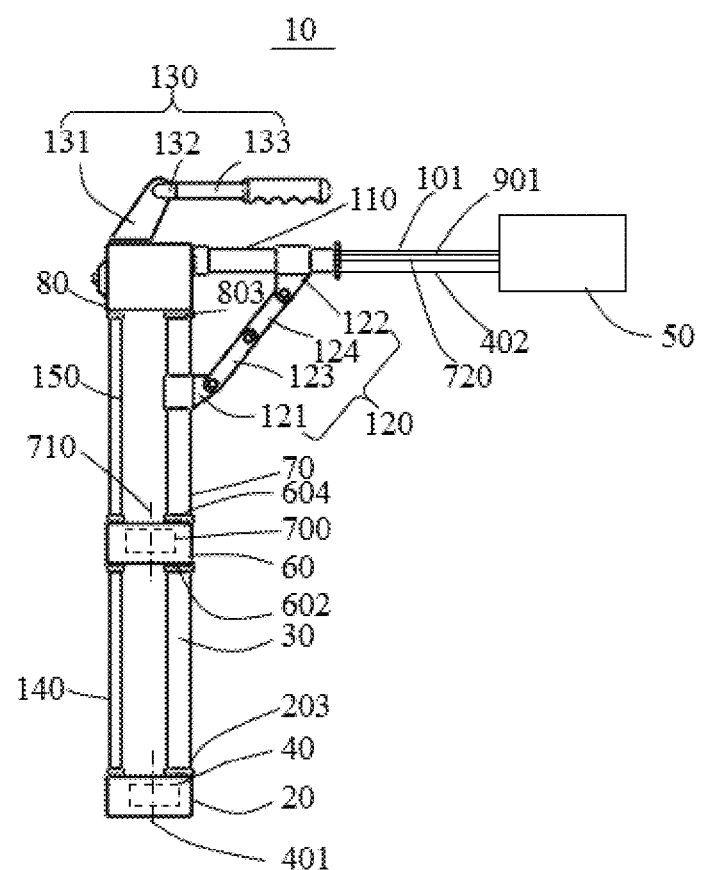
FIG. 2 is a schematic side view of the amphibious portable magnetism detector according to an embodiment of the present disclosure.
Figure 3:
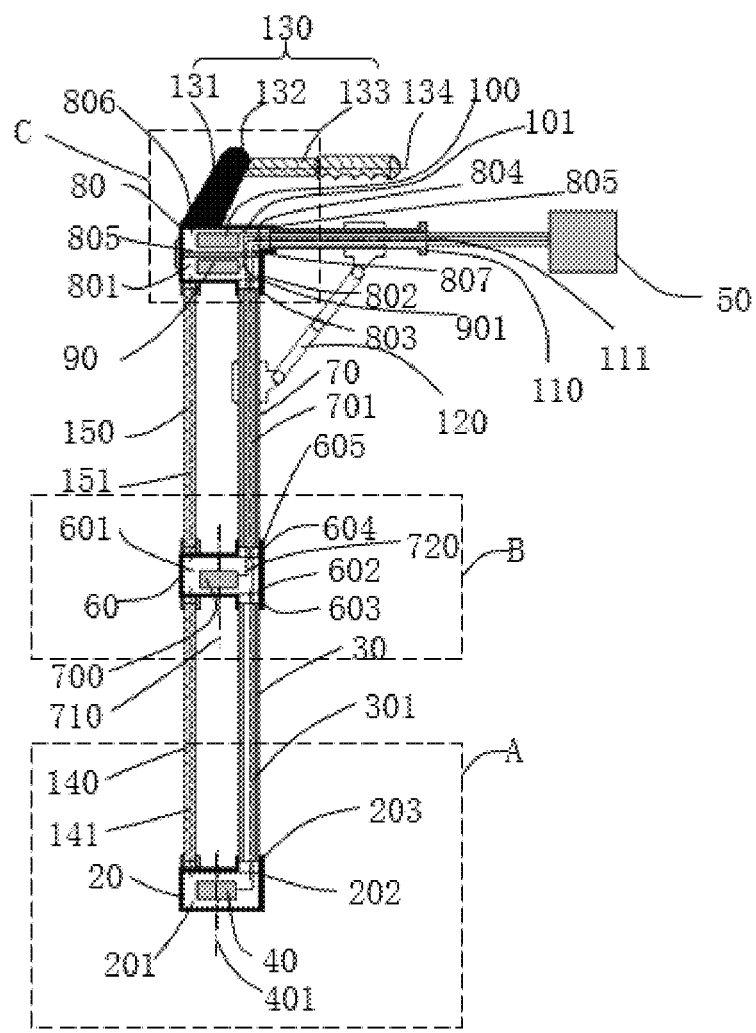
FIG. 3 is a schematic sectional view of the amphibious portable magnetism detector according to an embodiment of the present disclosure.
Figure 4:
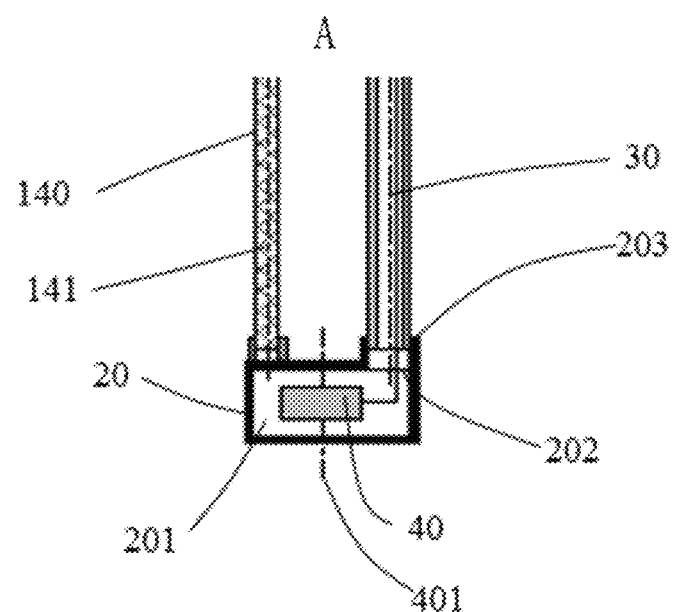
FIG. 4 is a partial enlarged view of the dashed-line block A of FIG. 3, showing a first housing of the amphibious portable magnetism detector according to an embodiment of the present disclosure.

For a clear understanding of the technical features, objects and effects of the present disclosure, specific embodiments of the present disclosure will now be described in detail with reference to the accompanying drawings. It is to be understood that the following description is merely exemplary embodiments of the present disclosure, and is not intended to limit the scope of the present disclosure.

It will be understood that when an element is referred to as being "connected" or "coupled" to another element, it can be directly connected or coupled to the other element, or indirectly connected or coupled to the other element through intervening elements. It should be also noted that the terms such as "first" and "second" are only used herein to distinguish an entity or operation from another entity or operation, and not necessarily require or imply any actual relationship or order between those entities and operations. Moreover, the terms such as "central," "upper," "lower," "front," "rear," "left," "right," "vertical," "horizontal," "top," "bottom," "inner," "outer," should be construed to refer to the orientation as then described or as shown in the drawings under discussion. These relative terms are for convenience of description and do not require the present disclosure be constructed or operated in a particular orientation.

Referring to FIGS. 1 to 4, an amphibious portable magnetism detector 10 is provided in an embodiment of the present disclosure. The magnetism detector 10 can include a first housing 20, a first wiring tube 30, a first magnetic field sensor 40, and a central control device 50. The first housing 20 can define a first inner space 201 therein and a first through hole 202 in communication with the first inner space 201. The first wiring tube 30 can be disposed outside the first housing 20, mechanically connected to the first housing 20, and in communication with the first inner space 201 via the first through hole 202. A first leak-tight seal can be formed between the first wiring tube 30 and the first housing 20 to keep the first housing 20 leak-tight. The first magnetic field sensor 40 can be disposed in the first inner space 201. The first magnetic field sensor 40 can detect a magnetic field at a target area and generate a first detection signal. The central control device 50 can be electrically connected to the first magnetic field sensor 40. The central control device 50 can receive the first detection signal and output a first magnetic field value according to the first detection signal.

In the present disclosure, due to the first leak-tight seal between the first wiring tube 30 and the first housing 20, the first housing 20 can be leak-tight to prevent water from entering into the first inner space 201, thereby effectively avoiding the damage of the first magnetic field sensor 40 caused by water and ensuring the normal operation of the first magnetic field sensor 40. The magnetism detector 10 can be applied not only one dryland, but also on wetland or water area such as a riverbed or a seabed. When the magnetism detector 10 is used on wetland or water area, the first housing 20 can be delivered underwater to a predetermined depth by moving the first wiring tube 30, while the central control device 50 can stay outside the water so that the operator can control and monitor the detection.

The first magnetic field sensor 40 can have a first detection axis 401 substantially parallel to or coincident with a first central axis 301 along a length direction of the first wiring tube 30. The first wiring tube 30 can be disposed vertically (i.e., the first central axis 301 of the first wiring tube 30 can coincide with a direction of gravity) during the detection, so that the first detection axis 401 can be disposed vertically during the detection.

The connection between the first wiring tube 30 and the first housing 20 can be achieved by various means. In an embodiment, the first housing 20 can include a first connecting tube 203 extending from the first through hole 202 away from the first inner space 201. One end of the first wiring tube 30 can be inserted into the first connecting tube 203, and the first leak-tight seal can be formed between an outer wall of the first wiring tube 30 and an inner wall of the first connecting tube 203. Alternatively, the first connecting tube 203 can be inserted into one end of the first wiring tube 30, and the first leak-tight seal can be formed between an inner wall of the first wiring tube 30 and an outer wall of the first connecting tube 203.

The outer wall of the first wiring tube 30 can be attached to the inner wall of the first connecting tube 203, for example, by a welding method, an adhesive bonding method, a hot-melt connection method, to form the first leak-tight seal. In an embodiment, a material of the outer or inner wall of the first wiring tube 30 and a material of the inner or outer wall of the first connecting tube 203 can be diffusion bonded to each other, for example, by the hot-melt connection method, to ensure the first leak-tight seal.

In an embodiment, the first connecting tube 203 and the first through hole 202 each can have a circular cross-section. An inner diameter of the first connecting tube 203 can be substantially the same as a diameter of the first through hole 202. The outer diameter of the first wiring tube 30 can be the same as or slightly smaller than the inner diameter of the first connecting tube 203, or the outer diameter of the first connecting tube 203 can be the same as or slightly smaller than the inner diameter of the first wiring tube 30. The outer diameter of the first wiring tube 30 can be about 50 mm to about 500 mm, so as to achieve a good supporting ability to deliver the first housing 20 underwater.

In an embodiment, a length of the first connecting tube 203 along its extending direction can be larger than or equal to one-third of the diameter of the first through hole 202. A length of the portion of the first wiring tube 30 inserted into the first connecting tube 203 can be larger than or equal to a half of the length of the first connecting tube 203. In this way, there can be a relatively large contact area between the outer wall of the first wiring tube 30 and the inner wall of the first connecting tube 203, thereby achieving a better leak-tight seal between the first wiring tube 30 and the first housing 20, so as to protect the magnetism detector 10 operated underwater.

In an embodiment, the first housing 20 can be leak-tight underwater at a depth (i.e., a distance below the water surface) of 100 meters or more. A material of the first housing 20 can have a high magnetic permeability to ensure the detection accuracy of the first magnetic field sensor 40. A material of the first wiring tube 30 can have a high rigidity so that the first wiring tube 30 can have a good supporting ability. The material of the first housing 20 and the material of the first wiring tube 30 can be lightweight so that the magnetism detector 10 can be lightweight to ensure its portability. In an embodiment, the material of the first housing 20 and/or the material of the first wiring tube 30 can be carbon fibers which satisfy all the above-described requirements.

A shape of the first housing 20 is not limited herein and can be a regular shape or an irregular shape, such as a rectangular shape, a square shape, a cylinder shape, a fan shape, and a wavy shape. The shape of the first housing 20 can be designed in accordance with a shape of the first magnetic field sensor 40. For example, if the first magnetic field sensor 40 has a rectangular shape, the first housing 20 can also has a substantially rectangular shape to make better use of the volume of the first housing 20.

The first magnetic field sensor 40 can be fixed in the first inner space 201. For example, the first magnetic field sensor 40 can be fixed to the first housing 20 by a screw.

A signal wire and a power wire can be running in the first wiring tube 30. The first detection signal can be transmitted from the first magnetic field sensor 40 to the central control device 50 via the signal wire.

Figure 5:
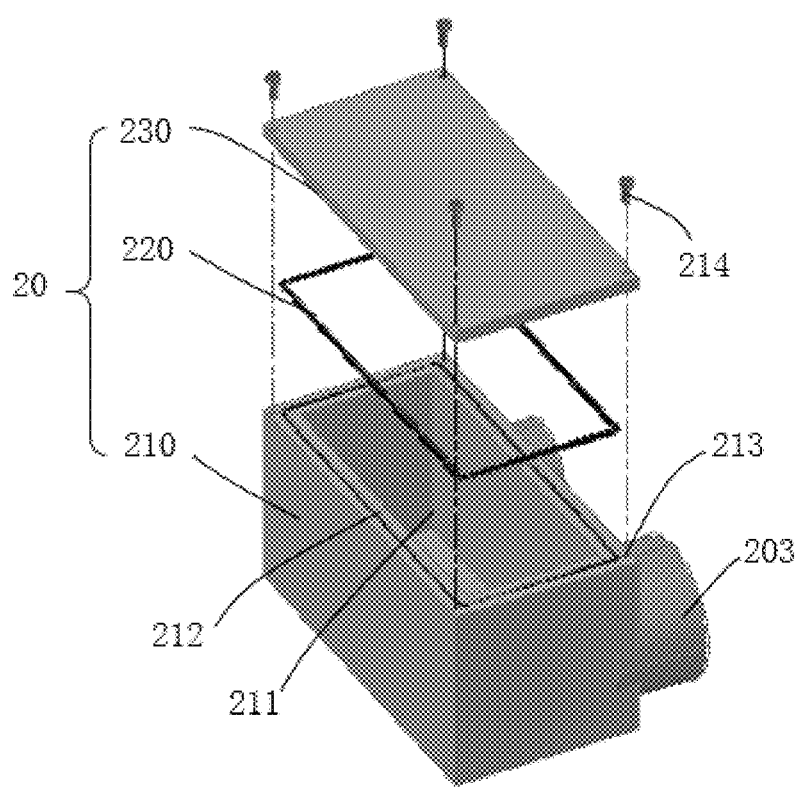
FIG. 5 is an exploded view of the first housing of the amphibious portable magnetism detector according to an embodiment of the present disclosure.
Figure 6:
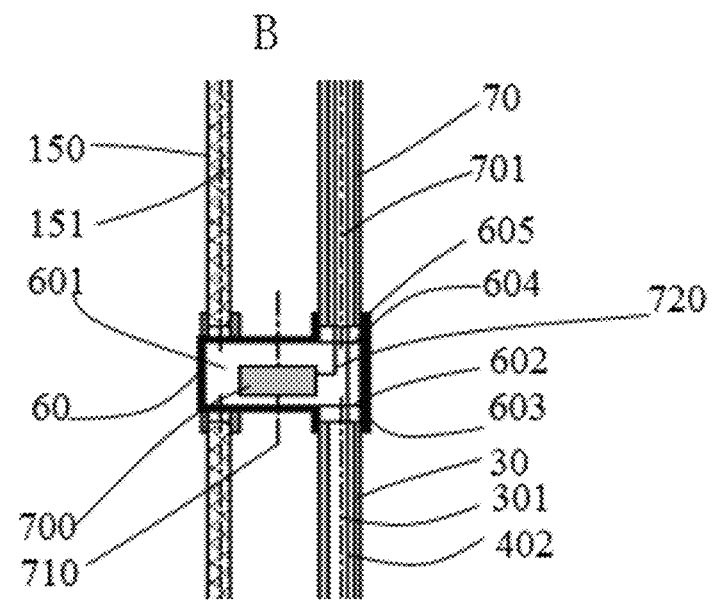
FIG. 6 is a partial enlarged view of the dashed-line block B of FIG. 3, showing a second housing of the amphibious portable magnetism detector according to an embodiment of the present disclosure.
Figure 7:
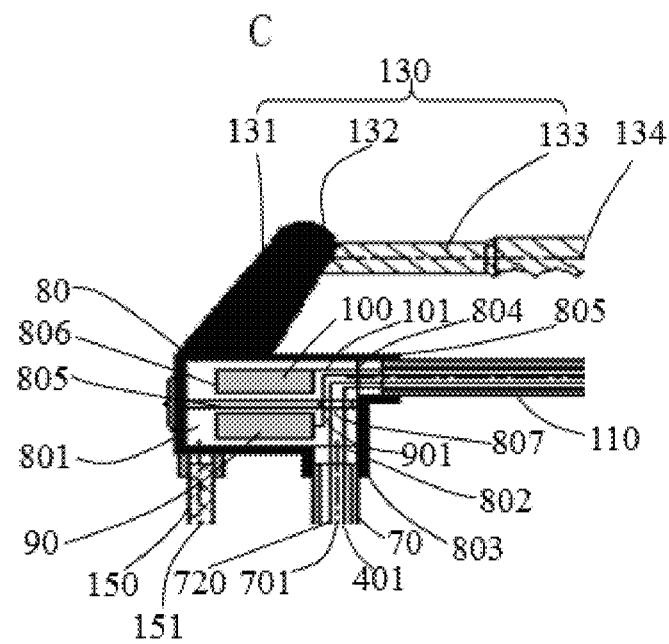
FIG. 7 is a partial enlarged view of the dashed-line block C of FIG. 3, showing a third housing, a connecting component, and a handle of the amphibious portable magnetism detector according to an embodiment of the present disclosure.

Referring to FIG. 5, in an embodiment, the first housing 20 includes a first box 210 with a first opening 211 and a first cover 230 for covering the first opening 211. The first magnetic field sensor 40 can be placed into the first box 210 via the first opening 211. The first opening 211 can have a size corresponding to or larger than the first magnetic field sensor 40. The first cover 230 can be fixed to the first box 210 and covered on the first opening 211 to seal the first opening 211 and define the first inner space 201. A leak-tight seal can be formed between the first box 210 and the first cover 230 covered on the first opening 211 to prevent water from entering into the first inner space 201 via the first opening 211.

In an embodiment, the first box 210 can define a first annular groove 212 surrounding the first opening 211. The first housing 20 can further include a first sealing ring 220. The first sealing ring 220 can be disposed in the first annular groove 212, covered by the first cover 230, and pressed between the first cover 230 and the first box 210. In this way, the leak-tight seal between the first box 210 and the first cover 230 can be ensured, so that the first inner space 201 can be leak-tight.

The first box 210 can define the first through hole 202. The first through hole 202 and the first opening 211 can be provided at different sides of the first box 210. The first connecting tube 203 can be located on the first box 210 and communicated with the first box 210. The through hole 202 can be surrounded by the first connecting tube 203.

The first cover 230 can be fixed to the first box 210 by various means. In an embodiment, the first box 210 defines a plurality of first threaded holes 213 surrounding the first annular groove 212. The first cover 230 defines a plurality of second threaded holes 215 located corresponding to the plurality of first threaded holes 213, respectively. The magnetism detector 10 can further include a plurality of bolts 214. The bolts 214 can be screwed into the first threaded holes 213 through the second threaded holes 215, so as to fix the first cover 230 to the first box 210.

Referring to FIGS. 1 to 3 and 6, the magnetism detector 10 can further include a second housing 60, a second wiring tube 70, and a second magnetic field sensor 700. The second housing 60 can define a second inner space 601 therein. The first wiring tube 30 can further be located outside the second housing 60, mechanically connected to the second housing 60, and in communication with the second inner space 601. The second wiring tube 70 can also be disposed outside the second housing 60, mechanically connected to the second housing 60, and in communication with the second inner space 601. The first wiring tube 30 and the second wiring tube 70 can be disposed at two opposite sides of the second housing 60. A second leak-tight seal can be formed between the first wiring tube 30 and the second housing 60, and a third leak-tight seal can be formed between the second wiring tube 70 and the second housing 60, so as to keep the second housing 60 leak-tight.

The second magnetic field sensor 700 can be disposed in the second inner space 601. The second magnetic field sensor 700 can detect the magnetic field at the target area and generate a second detection signal. The second magnetic field sensor 700 can be electrically connected to the central control device 50. The central control device 50 can receive the second detection signal and output a magnetic field gradient value according to the first detection signal and the second detection signal.

The second magnetic field sensor 700 can have a second detection axis 710 substantially coincident with the first detection axis 401 of the first magnetic field sensor 40 to improve the detection accuracy of the magnetic field gradient. The second magnetic field sensor 700 can be fixed in the second housing 60.

In an embodiment, the second housing 60 can define a second through hole 602 in communication with the second inner space 601. The first wiring tube 30 can be mechanically connected to the second housing 60 and in communication with the second inner space 601 via the second through hole 602. In an embodiment, the second housing 60 can include a second connecting tube 603 extending from the second through hole 602 away from the second inner space 601. The other end of the first wiring tube 30 can be inserted into the second connecting tube 603, and the second leak-tight seal can be formed between the outer wall of the first wiring tube 30 and an inner wall of the second connecting tube 603. Alternatively, the second connecting tube 603 can be inserted into the other end of the first wiring tube 30, and the second leak-tight seal can be formed between the inner wall of the first wiring tube 30 and an outer wall of the second connecting tube 603.

In an embodiment, the outer or inner wall of the first wiring tube 30 can be attached to the inner or outer wall of the second connecting tube 603 to form the second leak-tight seal. In an embodiment, a material of the outer or inner wall of the first wiring tube 30 and a material of the inner or outer wall of the second connecting tube 603 can be diffusion bonded to each other to form the second leak-tight seal.

In an embodiment, the second housing 60 can define a third through hole 604 opposite to the second through hole 602 and in communication with the second inner space 601. The second wiring tube 70 can be mechanically connected to the second housing 60 and in communication with the second inner space 601 via the third through hole 604. In an embodiment, the second housing 60 can further include a third connecting tube 605 extending from the third through hole 604 away from the second inner space 601. One end of the second wiring tube 70 can be inserted into the third connecting tube 605, and the third leak-tight seal can be formed between an inner wall of the second wiring tube 70 and an outer wall of the third connecting tube 605. Alternatively, the third connecting tube 605 can be inserted into one end of the second wiring tube 70, and the third leak-tight seal can be formed between the outer wall of the second wiring tube 70 and an inner wall of the third connecting tube 605.

In an embodiment, the outer wall/inner of the second wiring tube 70 can be attached to the inner or outer wall of the third connecting tube 605 to form the third leak-tight seal. In an embodiment, a material of the outer or inner wall of the second wiring tube 70 and a material of the inner or outer wall of the third connecting tube 605 can be diffusion bonded to each other to form the third leak-tight seal.

In an embodiment, the second through hole 602 and/or the third through hole 604 can have substantially the same shape and size as those of the first through hole 202. The second connecting tube 603 and/or the third connecting tube 605 can have substantially the same shape and size as those of the first connecting tube 203. The second wiring tube 70 can have substantially the same shape and size as those of the first wiring tube 30, except that their lengths can be same or different.

In an embodiment, a distance between the first housing 20 and the second housing 60 along an extending direction of the first wiring tube 30 is from about 300 mm to about 500 mm.

In an embodiment, a material of the second housing 60 can be the same as the material of the first housing 20. A material of the second wiring tube 70 can be the same as the material of the first wiring tube 30.

In an embodiment, the first wiring tube 30 and the second wiring tube 70 can be coaxially arranged. In other words, the first central axis 301 of the first wiring tube 30 can coincide with the second central axis 701 of the second wiring tube 70. In this way, the magnetism detector 10 can have a compact structure.

Referring to FIGS. 1 to 3, and 7, the magnetism detector 10 can further include a third housing 80 and a locating device 90. The third housing 80 can define a third inner space therein. The other end of the second wiring tube 70 can be mechanically connected to the third housing 80 and in communication with the third inner space. The locating device 90 can be disposed in the third inner space. The locating device 90 can locate the targeted area and generate a location signal. The locating device 90 can be electrically connected to the central control device 50. The central control device 50 can receive the location signal and obtain geographic coordinates of the targeted area according to the location signal.

The locating device 90 can be a satellite navigation receiver positioning by a global navigation satellite system (GNSS), such as GPS, GLONASS, Galileo, NavIC, or BeiDou. A differential signaling technology can be applied to increase the location accuracy. The locating device 90 can include an antenna. The antenna can be received and sealed in the third housing 80 when the third housing 80 is in water. The antenna can be protruded to the outside of the third housing 80 to increase the locating accuracy when the third housing 80 is not in water. The central control device 50 can store the magnetic field data and the location information associated with the magnetic field data, so that the operator can refer to the magnetic field data at any time or can compare the magnetic field data at different locations if necessary.

In an embodiment, the third housing 80 can define a fourth through hole 802 in communication with the third inner space 801. The second wiring tube 70 can be further mechanically connected to the third housing 80 and in communication with the third inner space 801 via the fourth through hole 802. In an embodiment, the third housing 80 can include a fourth connecting tube 803 extending from the fourth through hole 802 away from the third inner space 801. The other end of the second wiring tube 70 can be inserted into the fourth connecting tube 803, or the fourth connecting tube 803 can be inserted into the other end of the second wiring tube 70. A fourth leak-tight seal can be formed between the outer or inner wall of the second wiring tube 70 and the inner or outer wall of the fourth connecting tube 803.

In an embodiment, the outer/inner wall of the second wiring tube 70 can be attached to the inner or outer wall of the fourth connecting tube 803 to form the fourth leak-tight seal. In an embodiment, a material of the outer or inner wall of the second wiring tube 70 and a material of the inner or outer wall of the fourth connecting tube 803 can be diffusion bonded to each other to form the fourth leak-tight seal.

In an embodiment, the fourth through hole 802 can have substantially the same shape and size as those of the third through hole 604. The fourth connecting tube 803 can have substantially the same shape and size as those of the third connecting tube 605. In an embodiment, a material of the third housing 80 can be substantially the same as the second housing 60.

The magnetism detector 10 can further include an attitude sensor 100 disposed in the third housing 80. The attitude sensor 100 can detect a motion attitude of the locating device 90 and output an attitude signal. The attitude sensor 100 can be electrically connected to the central control device 50. The central control device 50 can receive the attitude signal and denoise the location signal according to the attitude signal to increase the locating accuracy.

The third inner space of the third housing 80 can be partitioned into a first chamber 801 and a second chamber 806. The locating device 90 can be disposed in the first chamber 801. The attitude sensor 100 can be disposed in the second chamber 806. In an embodiment, a partition plate 805 can be disposed in the third housing 80 to partition the third inner space into the first chamber 801 and the second chamber 806. The partition plate 805 can be fixed to an inner wall of the third housing 80.

The magnetism detector 10 can further include a connecting component 110 to mechanically connect the magnetism detector 10 to a wearable device. The connecting component 110 can be rigidly connected to the third housing 80. The wearable device can be, for example, overalls. The operator can carry the magnetism detector 10 in front by wearing the overalls connecting to the magnetism detector 10.

In an embodiment, the connecting component 110 can define a fourth inner space therein. For example, the connecting component 110 can have a tubular structure to define the fourth inner space. The third housing 80 can further define a fifth through hole 804 in communication with the third inner space. The fourth inner space of the connecting component 110 can be in communication with the third inner space of the third housing 80 via the fifth through hole 804. Signal wires and power wires can pass through the fourth inner space of the connecting component 110 to connect the central control device 50.

The connecting component 110 can have a third central axis 111 substantially perpendicular to the second central axis 701 of the second wiring tube 70, which is favorable to the connection of the magnetism detector 10 to the wearable device and the maintaining of balance of the magnetism detector 10 during detection.

The magnetism detector 10 can further include a reinforce component 120. One end of the reinforce component 120 can be mechanically connected to the connecting component 110 and the other end of the reinforce component 120 can be mechanically connected to the second wiring tube 70 to form a triangular structure, thereby supporting the connecting component 110.

In an embodiment, the reinforce component 120 can include a first fixing member 121, a second fixing member 122, and a reinforce member. The first fixing member 121 can include a first tubular portion sleeved outside the second wiring tube 70 and a first fixing portion connected to the first tubular portion. The second fixing member 122 can include a second tubular portion sleeved outside the connecting component 110 and a second fixing portion connected to the second tubular portion. One end of the reinforce member can be rigidly connected to the first fixing portion, and the other end of the reinforce member can be rigidly connected to the second fixing portion. In an embodiment, the reinforce member can include a first reinforce member 123 and a second reinforce member 124 rigidly connected to each with their ends.

In an embodiment, the magnetism detector 10 can further include a handle 130. The handle 130 can be connected to the third housing 80. The operator can hold the magnetism detector 10, move the magnetism detector 10, and control the detection direction of the magnetism detector 10 via the handle 130.

In an embodiment, the handle 130 can include a first handle member 131, a second handle member 132, and a third handle member 133 connected in sequence end by end. The first handle member 131 can be fixedly connected to the third housing 80. The second handle member 132 and the third handle member 133 each can be an elongated rod. The first handle member 131 can be disposed in a plane parallel to both the second central axis 701 and the third central axis 111. The second handle member 132 can be disposed perpendicular to the plane. The third handle member 133 can extend toward the connecting component 110 and be disposed parallel to third central axis 111, i.e., the third handle member 133 can have a fourth central axis 134 parallel to third central axis 111. In this way, the fixing handle member 131, the second handle member 132, and the third handle member 133 can form a bending structure which is convenient for the operator to grip the third handle member 133 when the operator wears the wearable device connecting to the magnetism detector 10.

The bending structure can be designed to be appropriate for the left-hander or the right-hander, which depends on an extending direction of the second handle member 132.

In an embodiment, the handle 130 can include two second handle members 132 and two third handle members 133. The two second handle members 132 can be disposed symmetrically about the first handle member 131, and the two third handle members 133 can also be disposed symmetrically about the first handle member 131 to form two bending structures appropriate for the left-hander and the right-hander respectively.

The magnetism detector 10 can further include a first reinforce rod 140 and a second reinforce rod 150. The first reinforce rod 140 can be rigidly connected between the first housing 20 and the second housing 60. The second reinforce rod 150 can be rigidly connected between the second housing 60 and the third housing 80. In this way, the stability of the whole structure of the magnetism detector 10 can be improved.

A material of the first reinforce rod 140 and/or a material of the second reinforce rod 150 can be the same as the material of the first wiring tube 30 and/or a material of the second wiring tube 70. The first reinforce rod 140 and the second reinforce rod 150 can each have a circular cross-section with a diameter of about 10 mm to about 20 mm, for example, about 15 mm. By disposing the first reinforce rod 140 and/or the second reinforce rod 150, a part of the force exerted on the first wiring tube 30 and/or the second wiring tube 70 can be transferred to the first reinforce rod 140 and/or the second reinforce rod 150, so that the whole structure of the magnetism detector 10 is more stable.

The magnetism detector 10 can further include a first signal wire 402. One end of the first signal wire 402 can be electrically connected to the first magnetic field sensor 40. The first signal wire 402 can run through the first wiring tube 30, the second wiring tube 70, and the fourth inner space of the connecting component 110 and have the other end thereof electrically connected to the central control device 50. The first detection signal can be transmitted from the first magnetic field sensor 40 to the central control device 50 via the first signal wire 402.

The magnetism detector 10 can further include a second signal wire 720. One end of the second signal wire 720 can be electrically connected to the second magnetic field sensor 700. The second signal wire 720 can run through the second wiring tube 70 and the inner space of the connecting component 110, and have the other end thereof electrically connected to the central control device 50. The second detection signal can be transmitted from the second magnetic field sensor 700 to the central control device 50 via the second signal wire 720.

The magnetism detector 10 can further include a third signal wire 901. One end of the third signal wire 901 can be electrically connected to the locating device 90. The third signal wire 901 can run through the inner space of the connecting component 110 and have the other end thereof electrically connected to the central control device 50. The location signal can be transmitted from the locating device 90 to the central control device 50 via the third signal wire 901.

The magnetism detector 10 can further include a fourth signal wire 101. One end of the fourth signal wire 101 can be electrically connected to the attitude sensor 100. The fourth signal wire 101 can run through the inner space of the connecting component 110 and have the other end thereof electrically connected to the central control device 50. The attitude signal can be transmitted from the attitude sensor 100 to the central control device 50 via the fourth signal wire 101.

The technical features of the above-described embodiments may be arbitrarily combined. In order to make the description simple, not all possible combinations of the technical features in the above embodiments are described. However, as long as there is no contradiction in the combination of these technical features, the combinations should be in the scope of the present application.

What described above are only several implementations of the present application, and these embodiments are specific and detailed, but not intended to limit the scope of the present application. It should be understood by the skilled in the art that various modifications and improvements can be made without departing from the conception of the present application, and all fall within the protection scope of the present application. Therefore, the patent protection scope of the present application is defined by the appended claims

What is claimed is:

1. An amphibious portable magnetism detector, comprising:
    a first housing defining a first inner space and a first through hole in communication with the first inner space;
    a first wiring tube disposed outside the first housing, connected to the first housing, and in communication with the first inner space via the first through hole;
    a first magnetic field sensor disposed in the first inner space and configured to detect a magnetic field at a target area and generate a first detection signal; and
    a central control device electrically connected to the first magnetic field sensor and configured to receive the first detection signal and output a first magnetic field value according to the first detection signal;
    wherein a first leak-tight seal is formed between the first wiring tube and the first housing to keep the first housing leak-tight; the first housing comprises a first connecting tube extending from the first through hole away from the first inner space; one end of the first wiring tube is inserted into the first connecting tube, or the first connecting tube is inserted into one end of the first wiring tube; and the first leak-tight seal is formed between an outer or inner wall of the first wiring tube and an inner or outer wall of the first connecting tube.

2. The amphibious portable magnetism detector of claim 1, further comprising:
    a second housing defining a second inner space, a second through hole in communication with the second inner space, and a third through hole opposite to the second through hole and in communication with the second inner space;
    a second wiring tube disposed outside the second housing, connected to the second housing, and in communication with the second inner space via the third through hole;
    a second magnetic field sensor disposed in the second inner space, electrically connected to the central control device, and configured to detect the magnetic field at the target area and generate a second detection signal;
    wherein the first wiring tube is further disposed outside the second housing, connected to the second housing, and in communication with the second inner space via the second through hole, a second leak-tight seal is formed between the first wiring tube and the second housing and a third leak-tight seal is formed between the second wiring tube and the second housing to keep the second housing leak-tight;
    the central control device is further configured to receive the second detection signal and output a magnetic field gradient value according to the first detection signal and the second detection signal.

3. The amphibious portable magnetism detector of claim 2, further comprising:
    a third housing defining a third inner space and a fourth through hole in communication with the third inner space; and
    a locating device disposed in the third inner space, electrically connected to the central control device, and configured to locate the targeted area and generate a location signal;

wherein the second wiring tube is further disposed outside the third housing, connected to the third housing, and in communication with the third inner space via the fourth through hole;

the central control device is further configured to receive the location signal and obtain geographical coordinates of the targeted area according to the location signal.

4. The amphibious portable magnetism detector of claim 3, further comprising:

an attitude sensor disposed in the third inner space, electrically connected to the central control device, and configured to detect a motion attitude of the locating device and output an attitude signal;

wherein the central control device is further configured to receive the attitude signal and denoise the location signal according to the attitude signal.

5. The amphibious portable magnetism detector of claim 1, wherein a material the outer or inner wall of the first wiring tube and a material of the inner or outer wall of the first connecting tube are diffusion bonded to each other.

6. The amphibious portable magnetism detector of claim 1, wherein a length of the first connecting tube is larger than or equal to one-third of a diameter of the first through hole, and a length of a portion of the first wiring tube inserted into the first connecting tube is larger than or equal to a half of the length of the first connecting tube.

7. The amphibious portable magnetism detector of claim 2, wherein the second housing comprises a second connecting tube extending from the second through hole away from the second inner space and a third connecting tube extending from the third through hole away from the second inner space;

one end of the first wiring tube is inserted into the second connecting tube or the second connecting tube is inserted into one end of the first wiring tube, and the second leak-tight seal is formed between an outer or inner wall of the first wiring tube and an inner or outer wall of the second connecting tube; and one end of the second wiring tube is inserted into the third connecting tube or the third connecting tube is inserted into one end of the second wiring tube, and the third leak-tight seal is formed between an outer or inner wall of the second wiring tube and an inner or outer wall of the third connecting tube.

8. The amphibious portable magnetism detector of claim 7, wherein a material the outer or inner wall of the first wiring tube and a material of the inner or outer wall of the second connecting tube are diffusion bonded to each other; and a material the outer or inner wall of the second wiring tube and a material the inner or outer wall of the third connecting tube are diffusion bonded to each other.

9. The amphibious portable magnetism detector of claim 2, wherein the first wiring tube and the second wiring tube are rigid.

10. The amphibious portable magnetism detector of claim 2, wherein the first wiring tube has a circular cross-section with an outer diameter of about 50 mm to about 500 mm, and/or the second wiring tube has a circular cross-section with an outer diameter of about 50 mm to about 500 mm.

11. The amphibious portable magnetism detector of claim 2, wherein the first wiring tube and the second wiring tube are coaxially arranged.

12. The amphibious portable magnetism detector of claim 2, wherein the first magnetic sensor has a detection axis coincident with that of the second magnetic sensor.

13. The amphibious portable magnetism detector of claim 2, further comprising:

a first reinforce rod disposed parallel to the first wiring tube and rigidly connected between the first housing and the second housing; and/or a second reinforce rod disposed parallel to the second wiring tube rigidly connected to the second housing.

14. The amphibious portable magnetism detector of claim 13, wherein the first reinforce rod has a circular cross-section with a diameter of about 10 mm to about 20 mm, and/or the second reinforce rod has a circular cross-section with a diameter of about 10 mm to about 20 mm.

15. The amphibious portable magnetism detector of claim 3, further comprising:

a connecting component rigidly connected to the third housing to connect the amphibious portable magnetism detector to a wearable device;

wherein the connecting component is disposed substantially perpendicular to the first wiring tube and/or the second wiring tube.

16. The amphibious portable magnetism detector of claim 15, wherein the connecting component defines a fourth inner space, the third housing defines a fifth through hole in communication with the third inner space, the fourth inner space is in communication with the third inner space via the fifth through hole.

17. The amphibious portable magnetism detector of claim 15, further comprising:

a reinforce component, one end of the reinforce component is connected to the connecting component and the other end of the reinforce component is connected to the second wiring tube to form a triangular structure.

18. The amphibious portable magnetism detector of claim 15, further comprising:

a handle connected to the third housing;

wherein the handle has a bending structure such that an operator is capable of holding the amphibious portable magnetism detector in hand when the operator wears the wearable device.

19. The amphibious portable magnetism detector of claim 18, wherein the handle comprises a first handle member, a second handle member, and a third handle member connected in sequence end by end;

the fixing handle member is fixedly connected to the third housing;

the fixing handle member is disposed in a plane parallel to both the first wiring tube and the second wiring tube;

the second handle member is disposed perpendicular to the plane; and the third handle member is disposed parallel to connecting component and extends toward the connecting component.

* * * * *